(12) United States Patent
Schedgick et al.

(10) Patent No.: US 7,234,386 B2
(45) Date of Patent: Jun. 26, 2007

(54) THREE CHAMBER HYDRAULIC CYLINDER FOR AN ACTIVE VEHICLE SUSPENSION WITH INTEGRATED LOAD LEVELING

(75) Inventors: David James Schedgick, Menasha, WI (US); Michael J. Karolek, New Berlin, WI (US)

(73) Assignee: HUSCO International, Inc., Waukesha, WI (US)

( * ) Notice: Subject to any disclaimer, the term of this patent is extended or adjusted under 35 U.S.C. 154(b) by 0 days.

(21) Appl. No.: 11/213,269

(22) Filed: Aug. 26, 2005

(65) Prior Publication Data

US 2007/0044654 A1    Mar. 1, 2007

(51) Int. Cl.
*F01B 3/00* (2006.01)
*F01B 31/12* (2006.01)

(52) U.S. Cl. .............................. 92/113; 92/5 R; 92/52

(58) Field of Classification Search ................ 91/1; 92/5 R, 52, 109, 113
See application file for complete search history.

(56) References Cited

U.S. PATENT DOCUMENTS

| | | | |
|---|---|---|---|
| 3,592,108 A | * | 7/1971 | Rosaen et al. ................ 92/52 |
| 3,701,499 A | | 10/1972 | Schubert et al. |
| 3,779,135 A | * | 12/1973 | Sugimura ...................... 92/15 |
| 4,053,865 A | * | 10/1977 | Brown, Jr. ................... 338/180 |
| 4,656,457 A | * | 4/1987 | Brausfeld et al. ............. 92/5 R |
| 4,879,440 A | * | 11/1989 | Lymburner .................. 92/5 R |
| 4,887,699 A | | 12/1989 | Ivers et al. |
| 4,953,089 A | | 8/1990 | Wolfe |
| 5,044,455 A | | 9/1991 | Tecco et al. |
| 5,255,764 A | | 10/1993 | Kurabayashi et al. |
| 5,348,338 A | | 9/1994 | Kuriki et al. |
| 5,362,094 A | | 11/1994 | Jensen |
| 5,555,501 A | | 9/1996 | Furihata et al. |
| 5,603,387 A | | 2/1997 | Beard et al. |
| 5,642,282 A | | 6/1997 | Sonehara |
| 5,725,066 A | | 3/1998 | Beard et al. |
| 5,899,288 A | | 5/1999 | Schubert et al. |
| 6,249,728 B1 | | 6/2001 | Streiter |
| 6,321,887 B1 | | 11/2001 | Kurusu et al. |
| 6,394,238 B1 | | 5/2002 | Rogala |
| 6,405,750 B1 | | 6/2002 | Rogala |
| 6,575,484 B2 | | 6/2003 | Rogala et al. |
| 6,612,375 B2 | | 9/2003 | Rogala |
| 6,834,736 B2 | | 12/2004 | Kramer et al. |

FOREIGN PATENT DOCUMENTS

| | | |
|---|---|---|
| WO | WO 2004/060702 A1 | 7/2004 |
| WO | WO 2004/080734 A1 | 9/2004 |

* cited by examiner

*Primary Examiner*—Michael Leslie
(74) *Attorney, Agent, or Firm*—George E. Haas; Quarles & Brady LLP

(57) ABSTRACT

A hydraulic actuator for an active of semi-active vehicle suspension system has a cylinder with a piston therein. A piston rod is attached to the piston and extends out of the cylinder. First and second chambers are formed on opposites sides of the piston enabling the piston to be driven in a manner that counteracts vibrations in the vehicle, A third chamber is provided in the cylinder for connection to a load leveling apparatus. A novel structure reduces the overall length of the hydraulic actuator. A displacement sensor is incorporated into the hydraulic actuator to provide an electrical signal that indicated how far the piston rod extends from the cylinder.

22 Claims, 3 Drawing Sheets

THREE CHAMBER HYDRAULIC CYLINDER FOR AN ACTIVE VEHICLE SUSPENSION WITH INTEGRATED LOAD LEVELING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to active and semi-active hydraulic suspension systems for isolating a component, such as an operator cab or a seat, from vibrations in other sections of a vehicle while traveling over rough terrain; and more particularly to such hydraulic suspension systems which incorporate automatic load leveling.

2. Description of the Related Art

Vibration has an adverse affect on the productivity of work vehicles in which an operator cab is supported on a chassis. Such vehicles include agricultural tractors, construction equipment, and over the road trucks. The vibrations experienced by such vehicles reduce their reliability, increase mechanical fatigue of components, and most importantly produce human fatigue due to motion of the operator's body. Therefore, it is desirable to minimize vibration of the vehicle cab or the seat in which the operator sits and of other components of the vehicle.

Traditional approaches to vibration mitigation employed either a passive or an active suspension system to isolate the vehicle cab or seat along one or more axes to reduce bounce, pitch, and roll of the vehicle. Passive systems typically placed a series of struts between the vehicle chassis and the components to be isolated. Each strut included a parallel arrangement of a spring and a shock absorber to dampen movement. This resulted in good vibration isolation at higher frequencies produced by bumps, potholes and the like. However, performance a lower frequencies, such as encountered by a farm tractor while plowing a field, was relatively poor. The lower frequency vibrations can be in the same range as the natural frequency of the passive suspension system, thereby actually amplifying the vibration. Therefore, such previous vehicle suspension systems often performed poorly in the range of vibration frequencies to which the human body is most sensitive, i.e. one to ten Hertz.

Active and semi-active suspension systems place a cylinder and piston arrangement between the chassis and the cab or seat of the vehicle to isolate that latter component. The piston divides the cylinder into two internal chambers and an electronic circuit operates valves which control the flow of hydraulic fluid between the chambers.

U.S. Pat. No. 4,887,699 discloses an semi-active vibration damper in which the valve is adjusted to control the flow of fluid from one cylinder chamber into the other chamber. The valve is operated in response to one or more motion sensors, so that the fluid flow is proportionally controlled in response to the motion.

U.S. Pat. No. 3,701,499 describes a type of active isolation system in which a servo valve selectively controls the flow of pressurized hydraulic fluid from a source to one of the cylinder chambers and controls exhaustion of oil from the other chamber back to a tank supplying the source. A displacement sensor and an accelerometer are connected to the mass which is being isolated from vibration and provide input signals to a control circuit. In response, the control circuit operates the servo valve to determine into which cylinder chamber fluid should be supplied, from which cylinder chamber fluid should be drained and the rate of those respective flows. This application of pressurized fluid to the cylinder produces movement of the piston which counters the vibration.

For optimum vibration damping, the piston should be centered between the cylinder ends under static conditions. However, the piston may drift toward one end of the cylinder due to changes in the load on the vehicle. A similar drift occurs during prolonged vibrating conditions, such as when an agricultural tractor is plowing a field. Other effects, such as leakage of hydraulic fluid and friction between the piston and the cylinder, also affect the position of the piston under static conditions. To compensate for that piston drift, prior suspension systems included a sensor that indicated the distance between the vehicle components to which the cylinder/piston rod combination was connected and thus provide an indication of piston drift within the cylinder. In response to that signal, main control valve was opened to apply more fluid into one of the two cylinder chambers and exhaust fluid from the other chamber under static conditions to re-center the piston.

However this type of load leveling increased the power requirements of the active suspension system because the dynamic response has to overcome the weight of the supported mass with each activation. This requires that the pump of the vehicle's hydraulic system operate above the normal standby pressure that occurred otherwise when other hydraulic devices were not being operated, such as when the vehicle was being driven along the ground.

SUMMARY OF THE INVENTION

A hydraulic actuator is provided for an active or semi-active vehicle suspension system in which a control valve assembly is operated in response to sensed motion of the vehicle to control the hydraulic actuator in a manner that counteracts the motion. The suspension system includes a load leveling circuit which adjusts the hydraulic actuator for effects due to varying vehicle loads.

The hydraulic actuator includes piston slideably received in a cylinder thereby defining a first chamber and a second chamber in the cylinder. The cylinder also has a third chamber that is separated from the first and second chambers. A first port is provided for exchanging fluid between the first chamber and the control valve assembly, and a second port is provided for exchanging fluid between the second chamber and the control valve assembly. A third port creates a path for fluid to flow between the third chamber and the load leveling circuit. A piston rod, attached to the piston, has an end projecting outward from the cylinder and a surface within the third chamber.

The first and second chambers of the cylinder are selectively pressurized by operation of the control valve assembly which produces movement of the piston and the piston rod to counter the effects of vehicle motion. As the static position of the piston drifts within the cylinder, pressure in the third chamber is increased or decreased to reposition the piston for optimum operation.

In one embodiment of the hydraulic actuator, the cylinder has a tubular housing with first and second ends and a bore there between. An interior tube, with a passage there through, projects into the bore from the first end of the cylinder. The first and second ports open into the bore and the third port for the load leveling circuit communicates with the passage in the interior tube. The piston is slideably received within the cylinder bore and has an aperture through which the interior tube is slideably received. The first chamber is defined in the bore between the piston and the first end of the cylinder.

A tubular piston rod has a first end attached to the piston and a second end projecting outward through an aperture in the cylinder. The interior tube extends into the tubular piston rod. The second chamber is formed between the tubular piston rod and the cylinder with the second port opening into the second chamber. The third chamber is formed within the tubular piston rod adjacent the interior tube.

Preferably the hydraulic actuator incorporates a displacement sensor which produces an electrical signal indicating an amount that the piston rod extends from the cylinder. For example, the displacement sensor includes an electrically resistive element attached to one of the cylinder, the piston and the piston rod. A wiper is attached to another one of the cylinder, the piston and the tubular piston rod, and moveably engages the resistive material. The wiper moves along the electrically resistive element as the piston rod extends and retracts with respect to the cylinder, thereby changing resistance across a pairs of electrical contacts connected of the displacement sensor.

DETAILED DESCRIPTION OF THE INVENTION

Figure 1:
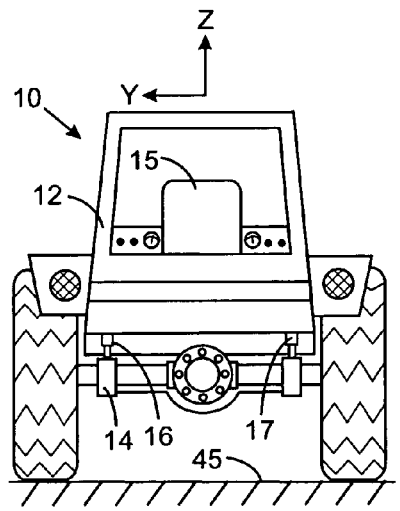
FIGS. 1 and 2 are rear and side views, respectively, of an agricultural tractor incorporating a suspension system according to the present invention.
Figure 2:
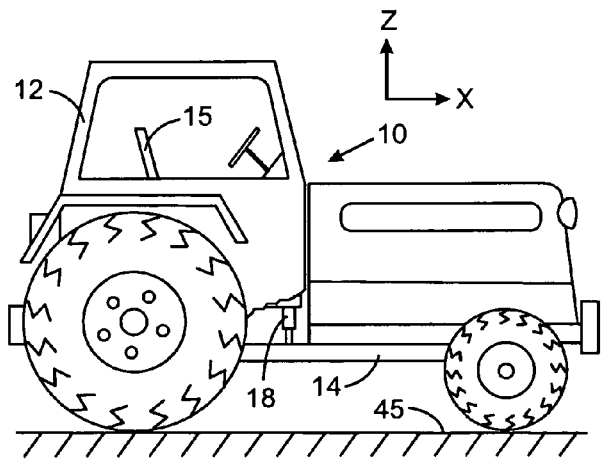

With reference to FIGS. 1 and 2, a vehicle 10, such as an agricultural tractor, has a cab 12 within which an operator sits on seat 15. The cab 12 is supported on the chassis 14 of the vehicle by three vibration isolators 16, 17 and 18. The first and second vibration isolators 16 and 17 are attached to the vehicle cab at the rear of the chassis 14. The third vibration isolator 18 is located at the center of the front of the cab 12. The three vibration isolators 16, 17 and 18 can be located at other positions underneath the cab and other numbers of isolators can be employed. Although the present invention is being described in the context of an isolation system which supports the cab 12 of the vehicle 10, this system also could be employed to isolate only the operator seat 15 from the floor of the cab 12. Similar vibration isolators also could be incorporated into the suspension for each wheel of an automobile and used in vibration mitigating systems for other types of equipment.

The vehicle cab 12 is susceptible to motion in several degrees of freedom. Movement in a vertical direction Z is commonly referred to as "bounce", whereas "roll" is rotation about the X axis of the vehicle 10, while rotation about the Y axis is referred to as "pitch." The illustrated three-point active suspension, provided by the three vibration isolators 16-18, addresses motion in these three degrees of freedom. However, one and two point suspension systems which address fewer degrees of freedom can also utilize the present invention.

Figure 3:
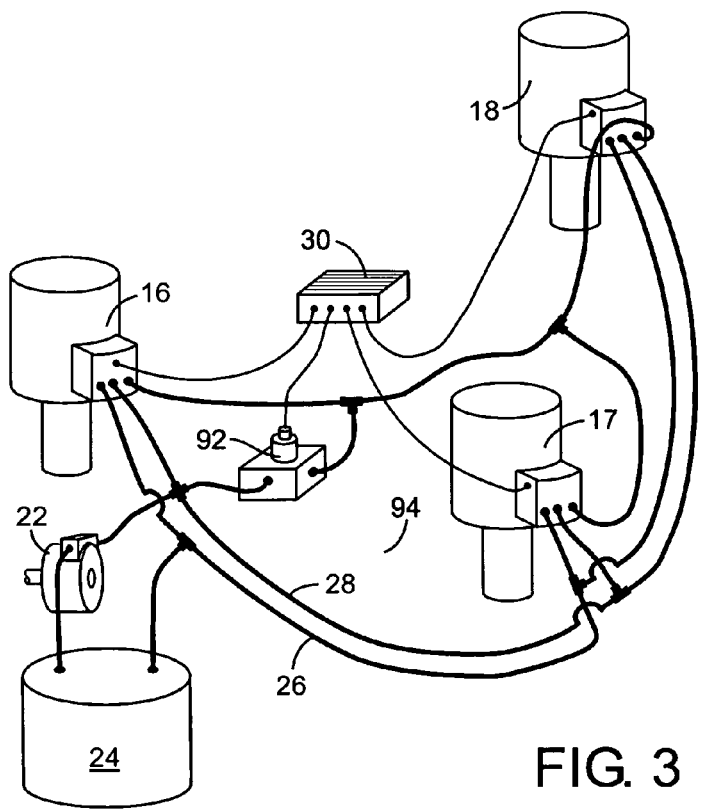
FIG. 3 is a representation of the active suspension system for the agricultural tractor.

FIG. 3 depicts the system 20 for operating the three vibration isolators 16-18. A pump 22, that is driven by the engine of the vehicle 10, draws fluid from a tank 24 and forces the fluid under pressure through a supply conduit 26 connected to the vibration isolators 16-18. The fluid returns from the vibration isolators 16-18 through a return conduit 28 back to the tank 24.

The vibration isolators 16-18 are operated by control signals received from a microcomputer based electronic controller 30, however a separate controller could be provided for each vibration isolator. The conventional controller 30 includes a memory which stores a software program for execution by the microcomputer. The memory also stores data used and produced by execution of that software program. Additional circuits are provided for interfacing the microcomputer to sensors and solenoid operated control valve for each vibration isolator 16-18 as will be described.

Figure 4:
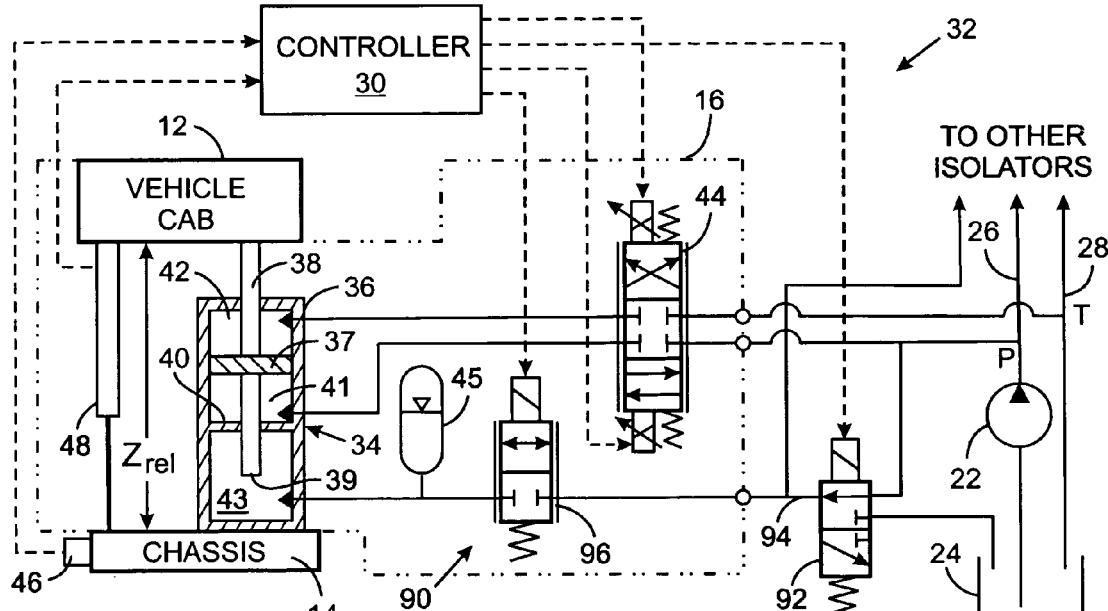
FIG. 4 is a diagram of the hydraulic circuit for one of the vibration isolators in the active suspension system.

FIG. 4 illustrates the hydraulic circuit 32 for the first vibration isolator 16, with the understanding that the other two vibration isolators 17 have identical hydraulic circuits. The first vibration isolator 16 has a hydraulic actuator 34 which comprises a hydraulic cylinder 36, pivotally connected to the chassis 14 of the vehicle, and a piston 37 with a rod 38 that is pivotally attached to the vehicle cab 12. However, the connections can be reversed in other installations of the vibration isolator 16. The piston 37 divides the interior of the cylinder 36 into a first chamber 41 and a second chamber 42, and an internal wall 40 in the cylinder defines a third chamber 43 into which a surface 39 of the piston rod 38 faces. The third chamber 43 is connected to an accumulator 45 which under normal operation of the vibration isolator 16 receives fluid therefrom when the piston rod 38 is forced farther into the third chamber 43 as the piston 37 moves and sends fluid back into the third chamber 43 when the piston rod 38 is partially withdrawn from the third chamber.

Figure 5:
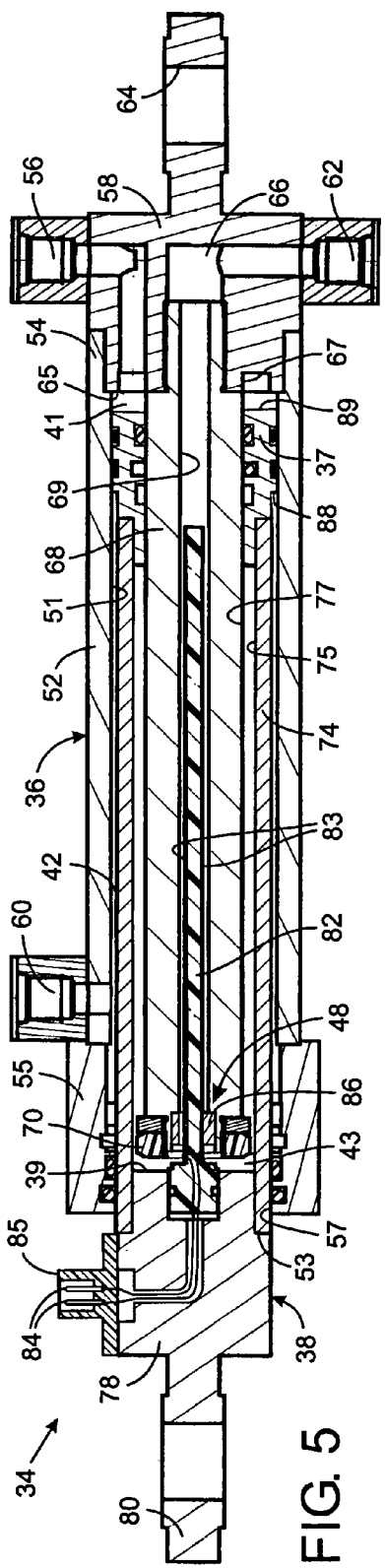
FIG. 5 is a longitudinal cross sectional view through a cylinder in the vibration isolator in which the cylinder incorporates a displacement sensor.

Although a cylinder could be constructed as depicted schematically in FIG. 4, in which the three chambers 41, 42 and 43 are located longitudinally along the cylinder, doing so creates a relatively lengthy cylinder as the third chamber 43 has to be as long as the combined lengths of the first and second chambers 41 and 42 in order to accommodate the full travel of the piston 37. Such a relatively large hydraulic actuator 34 severely limits the places at which the vibration isolator 16 can be used. As a consequence, a novel hydraulic actuator as shown in FIG. 5 has been developed which reduces the overall length of the device. This is accomplished by incorporating the third hydraulic chamber 43 inside a tubular piston rod.

The novel hydraulic actuator has first, second and third ports 56, 60 and 62 for connection to hydraulic fluid conduits. The cylinder of the hydraulic actuator 34 has a tubular housing 52 with first and second ends 53 and 54 and a bore 51 there between. An end cap 55, with an aperture 57 there through, is sealed to the housing 52 to close the first end 53. The second port 60 is adjacent to the first end 53. The second end 54 is closed by a fitting 58 sealed thereto and through which the first and third ports 56 and 62 lead to the bore 51 of the tubular housing 52. The third port 62 opens into a first cavity 66 in the middle of the an interior surface 65 of the fitting 58. The first port 56 communicates with an annular recess 67 extending around the first cavity 66 on the fitting's interior surface 65. The annular recess 67 defines a portion of the first chamber 41 of the hydraulic actuator. The fitting 58 also has a first coupling 64 for pivotally attaching the hydraulic actuator 34 to the chassis 14 of the motor vehicle 10.

An interior tube 68 is pressed into the first cavity 66 of the fitting 58 and extends at one end into the tubular housing 52 terminating a small distance before the end cap 55. The interior tube 68 has a central passage 69 extending from the one end to and opposite end. The opposite end has a resilient ring 70 attached thereto that acts as a stop against which the piston rod abuts in the fully retracted position and the piston abuts in the fully extended position.

The piston rod 38 comprises a tubular rod body 74 that extends into the cylinder's tubular housing 52 through the aperture 57 in the end cap 55 and around the interior tube 68. Thus rod body 74 has a central aperture 75 within which a portion of the interior tube 68 is located. O-rings in the aperture 57 provide a fluid tight seal around the rod body 74. The piston 37 is affixed to the interior end of the tubular rod body 74 in a fluid tight manner and has an aperture 77 through which the interior tube 68 extends with O-ring seals there between that allow the piston to slide within the cylinder bore 51. The outer circumferential surface of the piston 37 engages the inner circumferential surface of the cylinder housing 52 and has external O-rings there between to provide a fluid tight seal. The piston 37 is able to slide longitudinally within the cylinder 36 along both the cylinder housing 52 and the interior tube 68. The first chamber is located between the piston 37 and the fitting 58 and the second chamber 42 is formed between the exterior of the rod body 74 and the interior of the cylinder housing 52.

The piston rod 38 has a plug 78 sealed into the end of the rod body 74 that projects outward from the cylinder 36. This plug 78 has a second coupling 80 for attaching the hydraulic actuator 34 to the vehicle cab 12. The third chamber 43 of the hydraulic actuator 34 is formed within the tubular rod body 74 between the plug 78 and the free end of the cylinder interior tube 68 and around the circumferential outer surface of the interior tube to the piston 37. The plug 78 of the piston rod 38 has the surface 39 that faces into the third chamber 43.

A displacement sensor 48 is integrated into the hydraulic actuator 34 to provide an electrical signal indicating the amount that the piston rod 38 extends from the cylinder and thus the distance between the vehicle cab 12 and the chassis 14. Specifically, a rod-like sensor member 82 of an electrically non-conductive material is secured in an interior end of the plug 78 so as to extend along the passage 69 of the interior tube 68. As seen in FIG. 5, a gap exists between the outer surface of the sensor member 82 and the inner surface of the passage 69 allowing fluid to flow between the third port 62 in the cylinder fitting 58 and the third chamber 43 at the opposite end of the interior tube. Two stripes 83 of electrically resistive material commonly used in potentiometers are deposited separated from each other along the length of the sensor member 82. As used herein, the term "electrically resistive" means a material having a significant resistivity that the material would not be used as an electrical conductor where resistance is an undesired characteristic. Alternatively, only one of the stripes 83 may be formed of electrically resistive material while the other stripe is an electrical conductor, such as copper or aluminum. The two stripes 83 are connected by electrical wires to a pair of contacts 84 in a connector 85 on the outer surface of the plug 78, so that the displacement sensor 48 can be connected by an electrical cable to the controller 30. A wiper 86 of electrically conductive material is located at the interior end of the interior tube 68 and contacts both of the resistive stripes 83 on the sensor member 82 to provide an electrical bridge between those stripes. As the piston rod 38 slides into and out of the cylinder 36, the wiper 86 bridges the two resistive stripes 83 at different locations along the length of the sensor member 82 thereby varying the resistance appearing across the two contacts 84 of connector 85. The magnitude of that resistance changes with variation of the distance that the piston rod 38 extends from the cylinder 36 and thus the linear displacement between the vehicle cab 12 and the chassis 14. The wiper 86 has small apertures there through to allow fluid flow through the interior tube passage 69 between the third chamber 43 and the third port 62.

Figure 6:
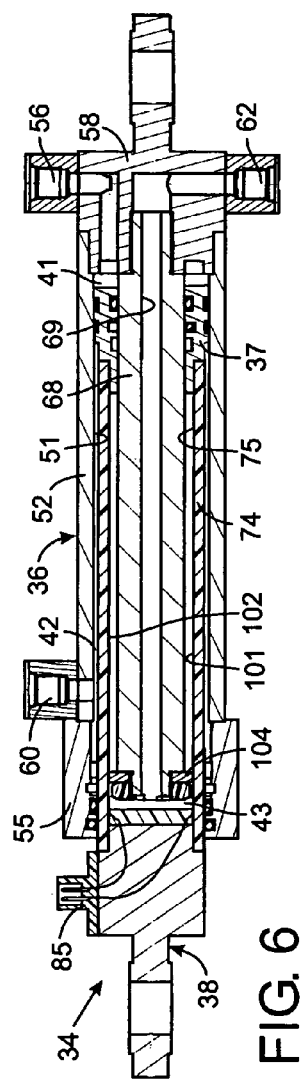
FIG. 6 is a longitudinal cross sectional view through a cylinder which incorporates a second version of a displacement sensor.
Figure 7:
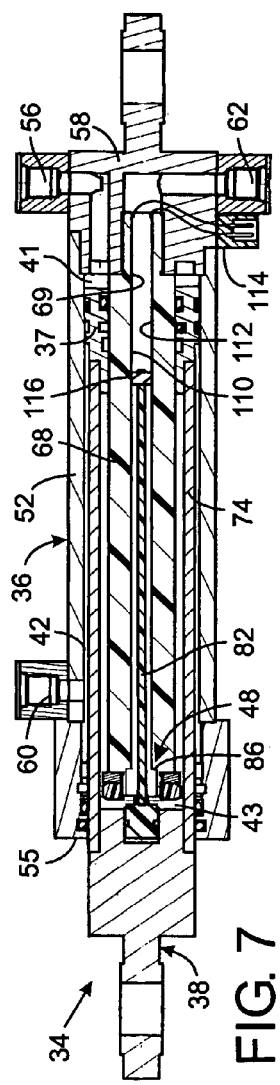
FIG. 7 is a longitudinal cross sectional view through a cylinder which incorporates a third version of a displacement sensor.

Alternatively as shown in FIG. 6, the displacement sensor 48 comprises stripes 100 and 102 of electrically resistive material deposited along the wall of the central aperture 75 in the rod body 74 with a wiper 104 located on the outer surface at the interior end of the interior tube 68. The wiper 104 has notches in the outer circumferential surface to allow fluid flow there through. In another version of the displacement sensor illustrated in FIG. 7, the electrically resistive stripes 110 and 112 are be deposited along the wall of the passage 69 in the interior tube 68 with wires leading to a connector 114 mounted on the fitting 58. In this alternative, a wiper 116 is positioned on the rod-like sensor member 82.

Returning to hydraulic circuit of the first vibration isolator 16 in FIG. 4, the cylinder 36 is connected to the supply and return conduits 26 and 28 by a three-position, four-way proportional control valve 44 which may be a conventional spool type valve, for example. The control valve 44 is moved from one position to another by solenoids which are activated by output signals from the electronic controller 30. In the illustrated center-off position, the first and second chambers 41 and 42 of the cylinder 36 are disconnected from the supply and tank return conduits 26 and 28. In one activated position, the control valve 44 connects the supply conduit 26 to the second chamber 42 and the tank return conduit 28 to the first chamber 41. This applies pressurized fluid to the second chamber 42 which tends to drive the piston 37 so that the rod 38 is retracted into the cylinder 36, thereby decreasing the distance between the vehicle cab 12 and the chassis 14. In the other activated position of the control valve 44, the supply conduit 26 is connected to the first chamber 41 of the cylinder 36 and the second chamber 42 is connected to the tank return conduit 28. Here, pressurized fluid applied to the first chamber 41 drives the piston 37 to extend the rod from the cylinder, thereby increasing the distance between the vehicle cab 12 and chassis 14.

The controller 30 operates the control valve 44 in response to input signals received from sensors on the vehicle 10. One such sensor is an accelerometer 46 that is attached to the vehicle chassis 14 and produces an electrical signal indicating vibrations that affect the vehicle cab. Other types of vibration sensors, such as a velocity sensor can be utilized to provide this vibration indicating input signal. The accelerometer 46 or other type of vibration sensor also can be mounted on the vehicle cab 12 instead of the chassis 14.

The displacement sensor 48 also is connected to the controller 30 which measures the resistance of that sensor to determine the relative displacement ($Z_{rel}$) between the vehicle cab 12 and chassis 14.

The controller 30 receives the signals from displacement sensor 48 and the accelerometer 46 which indicate instantaneous motion of the vehicle chassis 14 and determines movement of the piston 37 which is required to cancel that instantaneous motion from affecting the cab 12. Next the controller 30 ascertains the direction and amount of fluid flow required to produce that desired vibration canceling movement of the piston 37 and then derives the magnitude of electric current to apply to the control valve 44 to produce that fluid flow. That electric current magnitude is a function of the desired fluid flow and the characteristics of the particular control valve 44. The position and degree to which the control valve 44 is opened are respectively based on the direction and magnitude of the vibrational motion.

Referring to FIGS. 4 and 5, when the control valve 44 is activated to retract the piston rod 38, pressurized fluid from the pump 22 enters the second port 60 of the hydraulic actuator 34 and then flows into the second chamber 42 between the cylinder housing 52 and the tubular rod body 74. The pressure within the second chamber 42 exerts a force on an annular first surface 88 around the piston 37. At the same time, the second port 60 is coupled by the control valve 44 to the tank 24, thereby permitting fluid within the first chamber 41 on the opposite side of the piston 37 to be exhausted from the hydraulic actuator. As a result of a greater force being applied to the annular first surface 88 than to the piston's second surface 89 in the first chamber 41, the piston 37 is forced to the right in the orientation in FIG. 5 retracting the piston rod 38 farther into the cylinder 36 which draws the chassis and vehicle cab closer together.

Inversely, when the control valve 44 is placed in a position that couples the output of the pump 22 to the first port 56 of the hydraulic actuator, pressurized fluid is applied to the first chamber 41. In this state of the control valve 44, the second port 60 and thus the first cylinder chamber 41 are connected to the tank 24. Now, a greater pressure exists in the first chamber 41 than in the second chamber 42 thereby applying more force against the second surface 89 of the piston 37 than against the opposite annular first surface 88, which tends to extend the piston rod 38 from the cylinder 36.

The piston 37 should be approximately centered between the extreme ends of its travel within the cylinder, when only static external forces act on the hydraulic actuator 34, i.e. vibration is not occurring. This centered position optimizes the ability of the vibration isolator to accommodate motion of the vehicle cab in either direction. However, leakage of hydraulic fluid, friction between the piston and the cylinder, and changes in the load of the vehicle affect the position of the piston under static conditions. If the static position of the piston too close to one end of the cylinder, the piston may be prevented from moving enough toward that end to adequately counteract subsequently occurring vibrations. The centered position is indicated by the resistance of the displacement sensor 48 produced by the position of the wiper 86 along the sensor member 82 which resistance is measured at the controller 30. If during the static state, the displacement sensor 48 indicates a significant deviation of the piston from the center position, either due to drift of the hydraulic actuator 34 or to a significant change in the load acting on the vehicle, the controller 30 commences a load leveling operation.

With reference to FIGS. 4 and 5, that operation employs a load leveling circuit 90 and involves opening a directional valve 92 to couple a load leveling conduit 94 to either the output of the pump 22, in order to raise the vehicle cab with respect to the chassis, or to the tank 24 to lower the vehicle cab. The load leveling conduit 94 is attached to all three vibration isolators 16-18 in which the conduit is connected to a load leveling valve 96. The load leveling valve 96 is a solenoid operated, bidirectional proportional valve the controls the amount of fluid being supplied to or exhausted from the respective hydraulic actuator 34 when the controller 30 determines that the static position of that hydraulic actuator requires adjustment. When the load leveling valve 96 is open, fluid can flow to or from the third chamber 43 of the hydraulic actuator depending upon the position of the directional valve 92. To raise the piston 37 within the cylinder 36, the directional valve 92 is placed into the position in which the pump output is applied to the load leveling conduit 94 and the load leveling valve 96 is opened. The action adds fluid into the third chamber 43 which applies more force to the surface 39 of the piston rod 38 thereby extending the piston rod from the cylinder 38. Similarly, to lower the piston 37 the load leveling valve 96 is opened while the directional valve 92 is positioned to couple the load leveling conduit 94 to the tank 24. This latter action decreases the amount of fluid in the third chamber and retracts the piston rod into the cylinder 36. Therefore the position of the directional valve 92 determines whether raising of lowering is to occur and the state of the load leveling valve 96 of a given vibration isolator determines whether its associated hydraulic actuator is to be adjusted. While the load leveling valve 96 is opened, the four-way proportional control valve 44 may also have to be activated to alter the amounts of fluid within the first and second chambers 41 and 42 to allow motion of the piston 37, however force does not have to be applied to the piston to accomplish the load leveling. In fact, the center "closed" position of the control valve 44 may have a orifice that connected between the first and second cylinder chambers to enable fluid to flow there between to allow piston motion.

Figure 8:
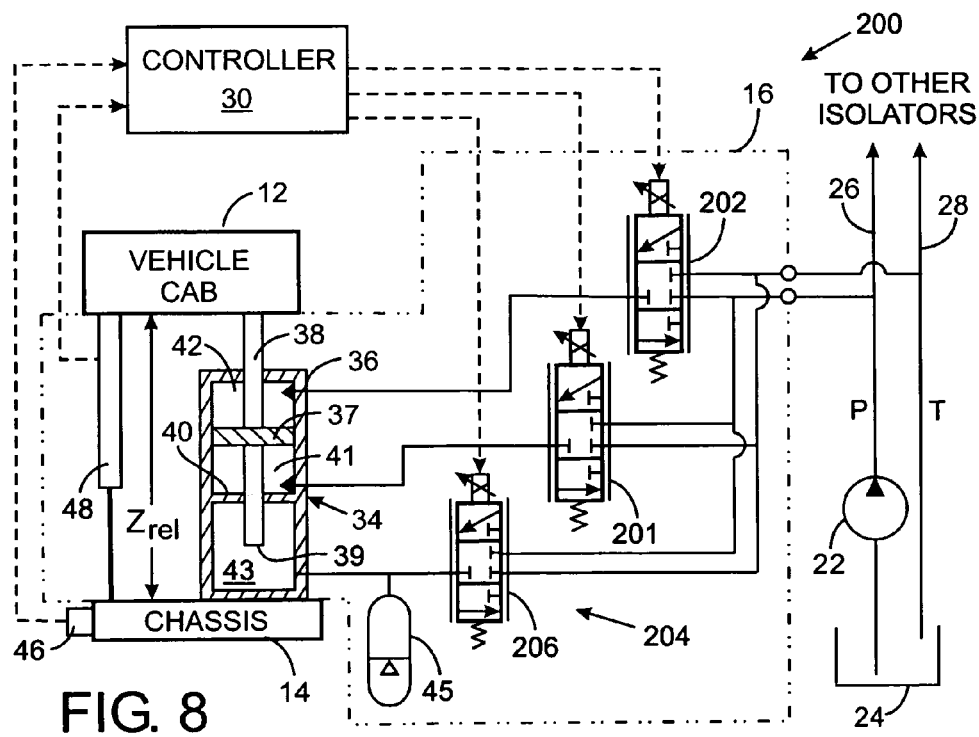
FIG. 8 is a diagram of an alternative hydraulic circuit for one of the vibration isolators in the active suspension system.

FIG. 8 discloses an alternative hydraulic circuit 200 for a vibration isolator 16-18. The hydraulic actuator 34 and other components of the circuit that are identical to those in the embodiment of FIG. 4 have been assigned identical reference numerals. The primary distinction between the circuits in FIGS. 4 and 6 is that the single control valve 44 has been replaced by a pair of three-way control valves 201 and 202 in FIG. 6. The first of these proportional control valves 201 connects the first chamber 41 of the hydraulic actuator 34 selectively to the pump supply conduit 26 or the return conduit 28 and has a center position in which the first chamber 41 is disconnected from both of those conduits. The second control valve 202 provides the identical function with respect to the second chamber 42 of the hydraulic actuator 34. Both the control valves 201 and 202 have solenoid operators which are activated by the controller 30 in similar manner to that described previously with respect to the single control valve 44. However, by providing separate proportional control valves, the flow into each cylinder chamber 41 and 42 can be independently controlled.

The alternative hydraulic circuit 200 also has a different version of the load leveling circuit 204 to manage the pressure within the third chamber 43 and thus the static position of the piston 37. Instead of the load leveling circuit having a directional valve 92 in common with all the vibration isolators 16-18, this alternative provides a proportional load leveling valve 206 in each isolator to couple the third chamber 43 of the respective cylinder 36 selectively to either the supply or return conduit 26 or 28. The load leveling valve 206 is a three-position, three-way type valve which when activated by the controller 30 determines the whether fluid from the supply conduit 26 flows into the third chamber or fluid from that chamber flows into the return conduit 28 and the rate of such flow.

While the load leveling valve 206 is opened, the three-way control valves 201 and 202 may also have to be activated to connect both of the first and second chambers 41 and 42 to the return conduit 28 allow motion of the piston 37. That connection enables fluid for fluid from the cylinder chamber that is collapsing to the chamber that is expanding.

This latter version of the load leveling circuit 204 can be used with the four-way, three-position proportional control valve 44 in FIG. 4, and conversely the load leveling circuit 90 in FIG. 4 can be used with the pair of three-way control valves 201 and 202 in FIG. 6.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A hydraulic actuator for a vehicle suspension system which includes a load leveling apparatus and a control valve assembly that operates in response to sensed motion, said hydraulic actuator comprising:
   a piston;
   a tubular piston rod attached to the piston;
   a cylinder within which the piston is slideably received with an end of the tubular piston rod projecting outward from the cylinder, a first chamber and a second chamber defined within the cylinder, a third chamber within the tubular piston rod and separated from the first and second chambers, the cylinder further comprising a first port for exchanging fluid between the first chamber and the control valve assembly, a second port for exchanging fluid between the second chamber and the control valve assembly, and a third port for exchanging fluid between the third chamber and the load leveling apparatus to alter position of the piston in the cylinder; and
   an interior member attached to the cylinder and extending into the tubular piston rod, wherein the third chamber extends around the interior member which has an end that is exposed in the third chamber.

2. The hydraulic actuator as recited in claim 1 wherein the first chamber and the second chamber are located within the cylinder on opposite sides of the piston.

3. The hydraulic actuator as recited in claim 1 wherein the cylinder comprises a housing with a first end, a second end and a bore there between within which the piston is movably received, the interior member projecting into the bore from the first end and having a passage there through, wherein the first port and the second port open into the bore, and the third port is in fluid communication with the passage.

4. The hydraulic actuator as recited in claim 3 wherein the piston has an aperture through which the interior member is slideably received.

5. The hydraulic actuator as recited in claim 3 wherein the piston rod comprises a rod body attached to the piston and into which the interior member extends, wherein the second chamber is formed between the rod body and the cylinder, and the third chamber is formed within the rod body around the interior member.

6. The hydraulic actuator as recited in claim 3 further comprising a displacement sensor which comprises:
   electrically resistive material attached to the piston rod and extending along the interior member; and
   an electrically conductive wiper attached to the interior member and slidably engaging the resistive material.

7. The hydraulic actuator as recited in claim 3 further comprising a displacement sensor that comprises:
   a pair of electrical contacts;
   a member attached to the piston rod and projecting into the passage of the interior member, and having a pair of stripes applied thereon and connected to the pair of electrical contacts, at least one of the pair of stripes formed by electrically resistive material; and
   a wiper attached to the interior tube and slidably engaging the pair of stripes thereby varying a resistance which appears across the pair of electrical contacts as the piston moves within the cylinder.

8. The hydraulic actuator as recited in claim 1 further comprising a displacement sensor which comprises:
   electrically resistive material on a surface of the cylinder; and
   an electrically conductive wiper attached to the piston rod and slidably engaging the resistive material.

9. The hydraulic actuator as recited in claim 1 further comprising a displacement sensor within the cylinder and producing an electrical signal indicating an amount that the piston rod extends from the cylinder.

10. The hydraulic actuator as recited in claim 9 wherein the displacement sensor comprises:
    an electrically resistive material attached to one of the cylinder, the piston, and the piston rod; and
    a wiper moveably engaging the resistive material and attached to another one of the cylinder, the piston, and the piston rod.

11. The hydraulic actuator as recited in claim 1 wherein the cylinder has a first coupling for attachment to a machine; and the piston rod has a second coupling for attachment to the machine.

12. The hydraulic actuator as recited in claim 1 wherein a surface of the piston is exposed in the third chamber.

13. A hydraulic actuator for a vehicle suspension system that includes a load leveling apparatus, said hydraulic actuator comprising:
    a cylinder comprising a housing with first and second ends and a bore there between, an interior tube projecting into the bore from the first end and having a passage there through to an open end, a first port opening into the bore adjacent the first end, a second port opening into the bore adjacent the second end, and a third port communicating with the passage for connection to the load leveling apparatus in order to exchange fluid between the third chamber and the load leveling apparatus; and;
    a piston slideably received within the bore and defining a first chamber within the bore between the piston and the first end of the cylinder, the piston having an aperture through which the interior tube is slideably received and
    a tubular piston rod attached to the piston and projecting outward through an aperture in the cylinder, the interior tube extending into the tubular piston rod, wherein a second chamber is formed between the tubular piston rod and the cylinder and into which the second port opens, and a third chamber is formed within the tubular piston rod around the interior tube and into which the passage communicates and the open end interior tube is exposed.

14. The hydraulic actuator as recited in claim 13 wherein the third chamber increases in volume as the piston rod extends farther from the cylinder.

15. The hydraulic actuator as recited in claim 13 wherein the tubular piston rod comprises:
   a tubular rod body with a first end attached to the piston and having a second end; and
   a plug closing the second end of the tubular rod body.

16. The hydraulic actuator as recited in claim 15 wherein the plug has a coupling for attaching the tubular piston rod to a machine.

17. The hydraulic actuator as recited in claim 13 further comprising a displacement sensor which produces an electrical signal indicating an amount that the tubular piston rod extends from the cylinder.

18. The hydraulic actuator as recited in claim 17 wherein the displacement sensor comprises:
   electrically resistive material attached to the tubular piston rod and extending along the interior tube; and
   an electrically conductive wiper attached to the interior tube and slidably engaging the resistive material.

19. The hydraulic actuator as recited in claim 17 wherein the displacement sensor comprises:
   a pair of electrical contacts;
   a member attached to the tubular piston rod and projecting into the interior tube, and having a pair of stripes applied thereon and connected to the pair of electrical contacts, at least one of the pair of stripes formed by electrically resistive material; and
   a wiper attached to the interior tube and slidably engaging the pair of stripes thereby varying a resistance which appears across the pair of electrical contacts as the piston moves within the cylinder.

20. The hydraulic actuator as recited in claim 17 wherein the displacement sensor comprises:
   an electrically resistive material attached to one of the cylinder, the piston, and the tubular piston rod; and
   a wiper moveably engaging the resistive material and attached to another one of the cylinder, the piston, and the tubular piston rod.

21. The hydraulic actuator as recited in claim 17 wherein the displacement sensor comprises:
   electrically resistive material on a surface of the cylinder, and
   an electrically conductive wiper attached to the piston rod and slidably engaging the resistive material.

22. The hydraulic actuator as recited in claim 13 wherein a surface of the piston is exposed in the third chamber.

* * * * *